United States Patent Office 3,338,882
Patented Aug. 29, 1967

3,338,882
2'- AND 3'-PHOSPHATES OF 1-β-D-ARABINO-FURANOSYLCYTOSINE
William J. Wechter, Kalamazoo, Mich., assignor to The Upjohn Company, Kalamazoo, Mich., a corporation of Delaware
No Drawing. Filed June 28, 1965, Ser. No. 468,190
15 Claims. (Cl. 260—211.5)

The present invention is concerned with novel organic compounds and more particularly with 1-β-D-arabinofuranosylcytosine (and 5- substituted-cytosine) 2'- and 3'-phosphates intermediates thereof and processes for the production thereof.

The novel products and processes of production thereof can be illustratively represented by the following synthetic sequences A, B and C:

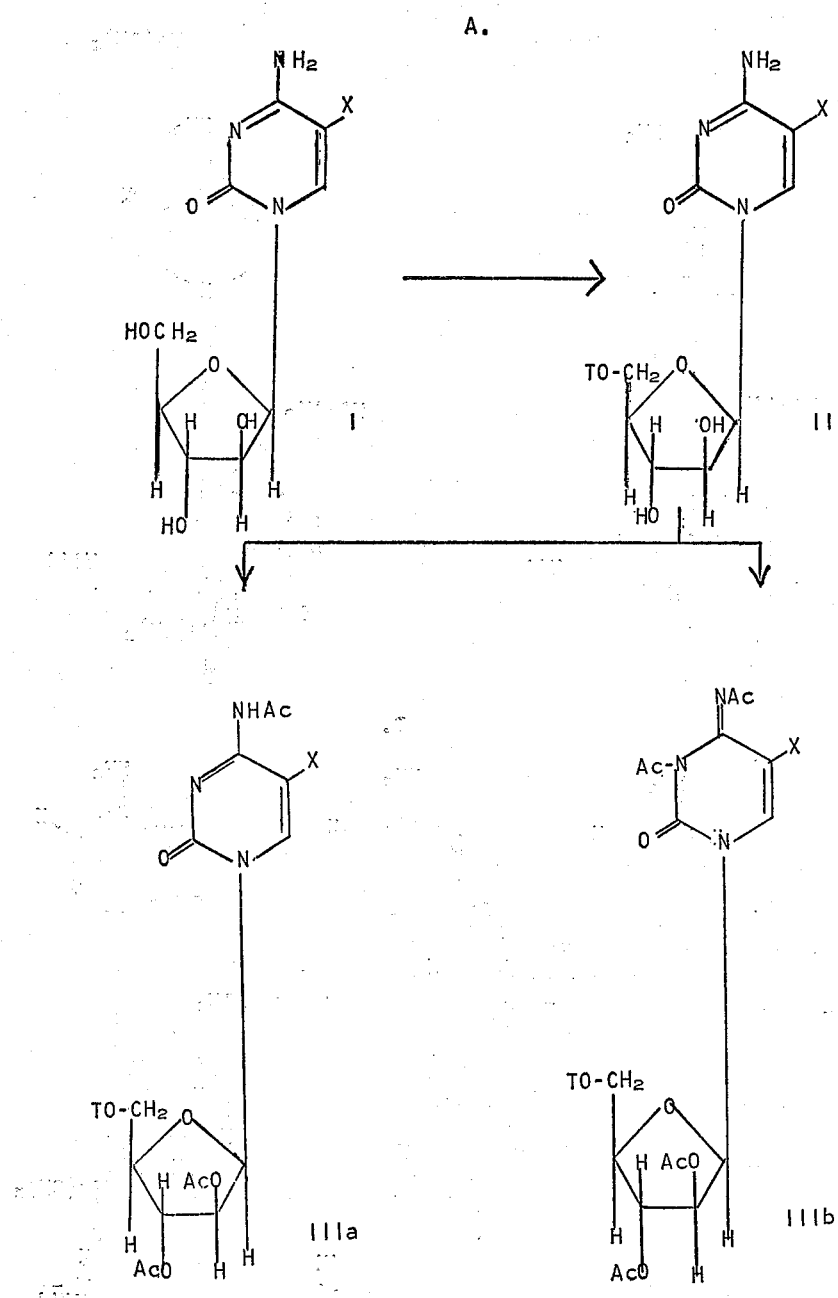

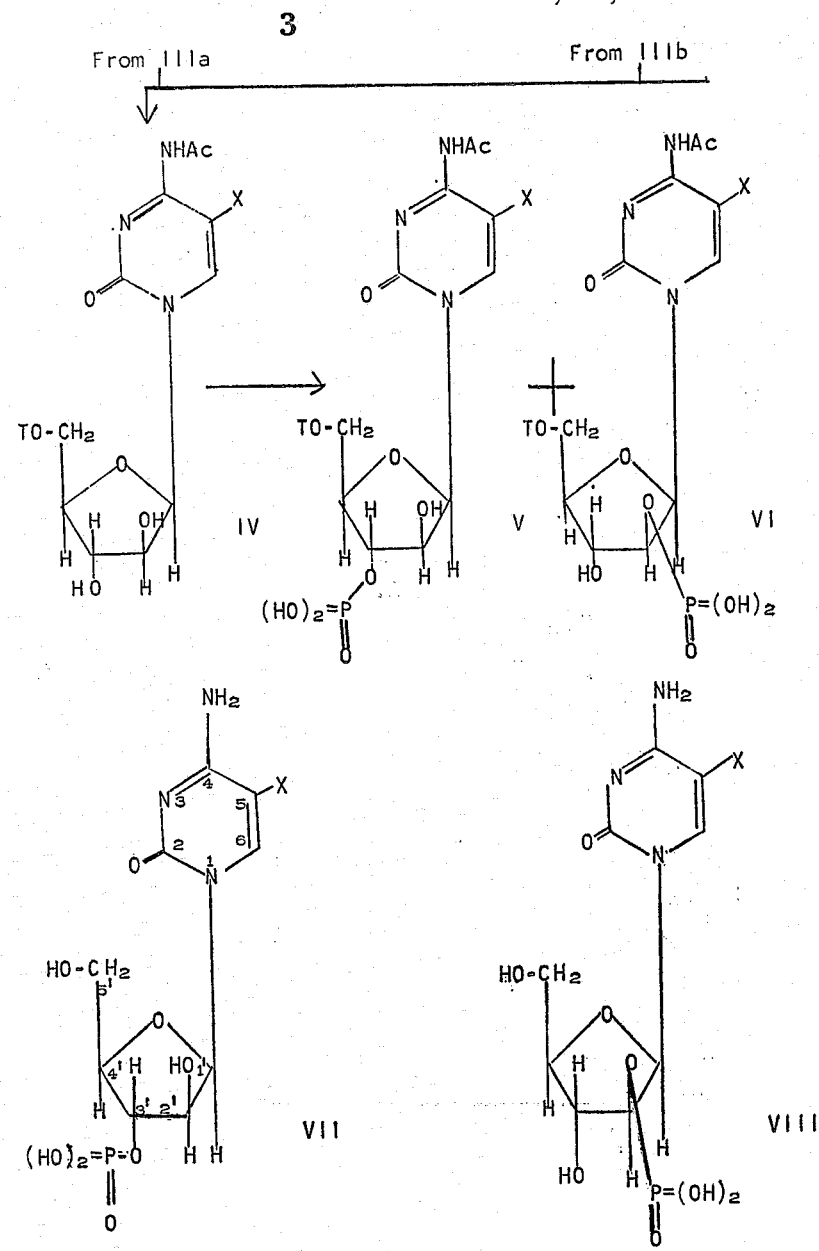
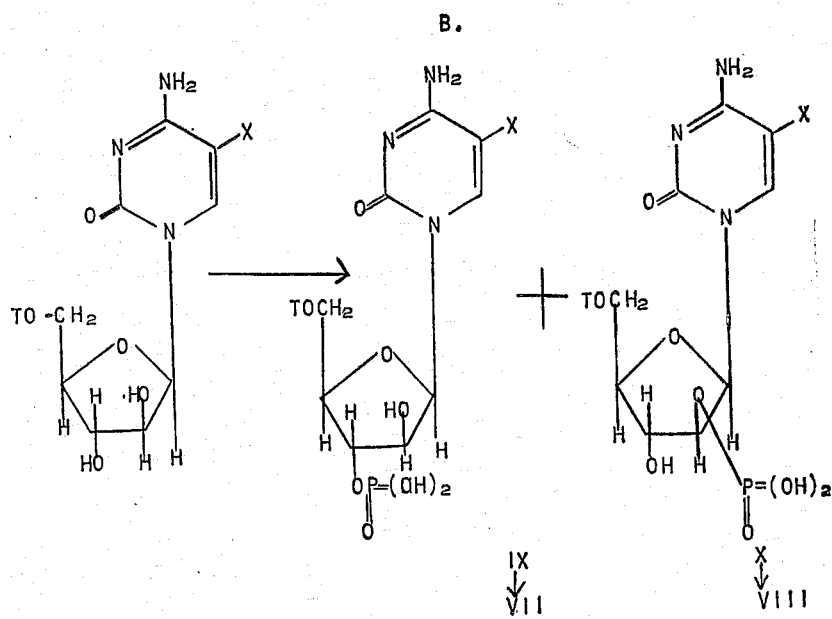

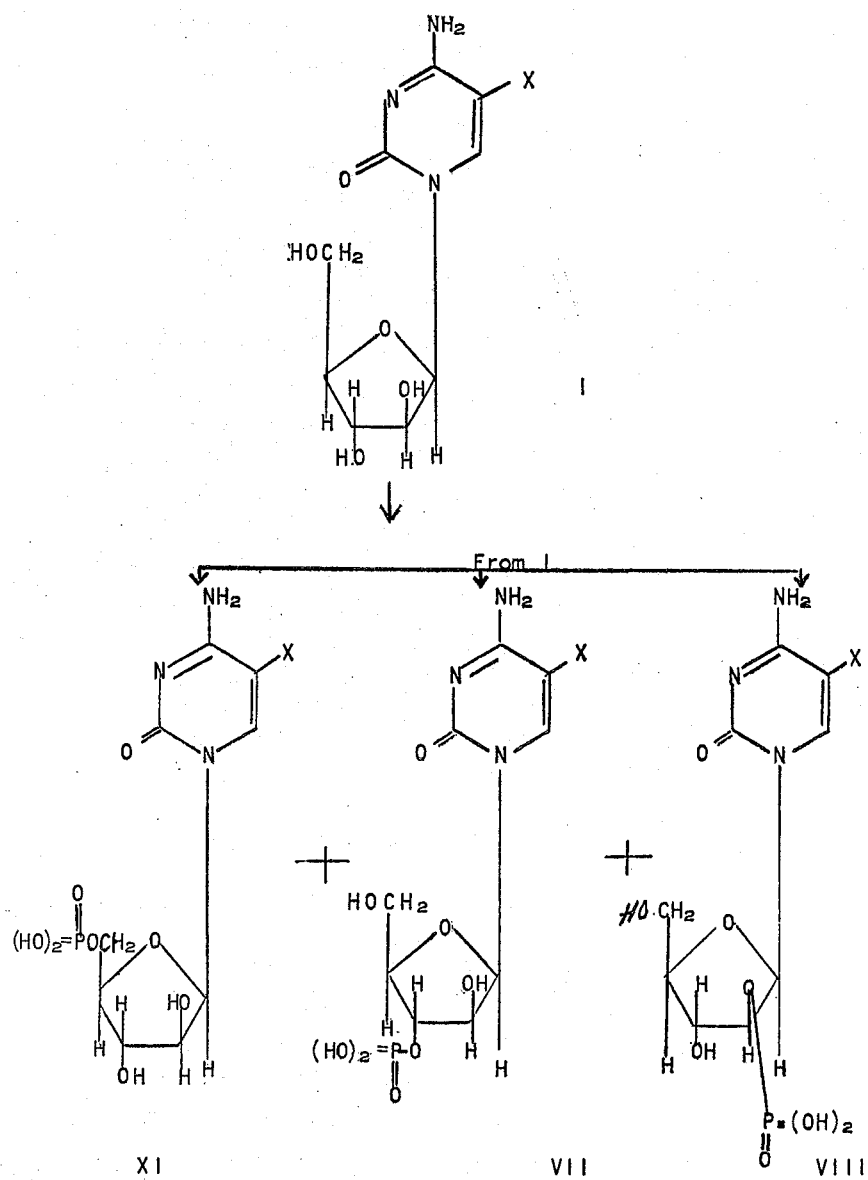

wherein Ac is the acyl group of a hydrocarbon carboxylic acid containing from 2 to 12 carbon atoms, inclusive, wherein T is selected from the group consisting of triphenylmethyl, (p-methoxyphenyl)-diphenylmethyl and bis(p-methoxyphenyl)phenylmethyl, and wherein X is selected from the group consisting of hydrogen, methyl, trifluoromethyl, fluorine, chlorine, bromine and iodine.

The processes of this invention comprise: Process A, treating a 1-β-D arabinofuranosylcytosine (I) or a salt thereof with triphenylchloromethane, triphenlybromomethane or p-methoxy-substituted triphenyl chloromethane and triphenylbromomethane to give the ether of Formula II; treating II with an acylating reagent selected from the acid chlorides, acid bromides, and acid anhydrides of hydrocarbon carboxylic acid containing from 2 to 12 carbon atoms to give an ether acylate compound of structural Formula IIIa or IIIb or a mixture containing both IIIa and IIIb: treating the compounds of Formula IIIa and IIIb with a base such as lithium hydroxide, sodium hydroxide, or potassium hydroxide at low temperature to give the corresponding N⁴-acyl-1-(5'-triphenylmethyl-β-D-arabinofuranosyl)cytosine (IV); treating compound IV with a phosphorylating agent, preferably 2-cyanoethyl phosphate in the presence of a condensing agent, preferably N,N-dicyclohexylcarbodiimide, and subsequent treatment with a base at low temperatures, to give the corresponding N⁴-acyl-1-(5'-triphenyl-methyl-1-β-D - arabinofuranosyl)cytosine 3' - phosphate and 2'-phosphate (compounds V and VI): treating compounds V and VI together or separately with 80% aqueous acetic acid and subsequently with anhydrous ammonia-containing methanol or ethanol provides the desired products 1-β-D-arabinofuranosylcytosine 3'-phosphate (VII) and 1-β-D-arabinofuranosylcytosine 2'-phosphate (VIII).

The compounds VII and VIII, according to synthetic sequence B, can also be obtained by direct phosphorylation of compound II with 2-cyanoethyl phosphate in the presence of dicyclohexylcarbodiimide and subsequent treatment with a base to give 1-(5'-triphenylmethyl-β-D-arabinofuranosyl)cytosine 2'-phosphate and 3'-phosphate (IX and X) which by treatment with aqueous acetic acid provides the desired compounds VII and VIII.

Direct phosphorylation synthetic sequence C) with 2-cyanoethyl phosphate in the presence of carbodiimide of compound I provides the 1-β-D-arabinofuranosylcytosine 2'-phosphate, 3'-phosphate and 5'-phosphate which can be separated from each other by chromatography.

The novel compounds, 1-β-D-arabinofuranosylcytosine 2′-phosphate and 3′-phosphate (VII and VIII), which can also have substituents in the 5-position, such as methyl, trifluoromethyl, halogens such as fluorine, chlorine, bromine and iodine, and the like, exhibit significant cytotoxic activity in vitro, particularly against KB tumor cells and against viruses, particularly the different types of Herpes, Coe, and Vaccinia viruses. Externally these compounds can be used for cleansing glassware and instruments used in the growing of tissue cultures for virus and tumor research, washing excise tumor tissue, intended for transplants into animals to inhibit the growth of any tumor cells that might otherwise seed surrounding tissues or be transported to other parts of the animal body. The antiviral activity can also be used to prepare cultures of microorganisms, free of viral phages, for example, phage-free antibiotic-producing Streptomyces cultures. These compounds are furthermore useful as intermediates in the preparation of oligonucleotide polymers containing the substituted or unsubstituted 1-β-D-arabinofuranosylcytosine 2′- or 3′-phosphate moiety. For this purpose compounds VII and VIII in their free acid form are condensed with other nucleosides in the presence of condensing agents, for example, dialkyl- or dicycloalkyl-carbodiimides, such as N,N′-dicyclohexylcarbodiimide.

The antiviral activity of compounds VII and VIII can be used to treat Herpes keratitis in the eye of virus infected domestic animals.

In carrying out the process of the present invention, 1-β-D-arabinofuranosylcytosine (I) as hydrochloride, hydrobromide or other salt, or as free base, is treated with an etherifying agent in a basic organic solvent. As etherifying agent, triphenylchloromethane, (p-methoxyphenyl)diphenylchloromethane, bis(p - methoxyphenyl)-phenylchloromethane and the bromo analogues of these three compounds are generally employed. As an organic base, pyridine, picolines, lutidines, trialkylamines and the like can be used, with pyridine preferred. The reaction can be carried out at a temperature between 0 and 116° C. and is preferably carried out at room temperature, between 20 and 30° C. The reaction time at room temperature requires a period of between 6 hours and 10 days. In the preferred embodiment of this invention, the 1-β-D-arabinofuranosylcytosine is stirred in pyridine solution with chlorotriphenylmethane or bromotriphenylmethane of a period of 6 hours to 10 days. Thereafter, the product is isolated by conventional means, such as pouring the mixture into water and separating the product after it has crystallized. The product can be purified by conventional means, such as recrystallization, for example, from acetone.

The acylation of the thus-obtained product, 1-(5′-O-triphenylmethyl-β-D-arabinofuranosyl)cytosine, is carried out with an acylating agent selected from acyl chlorides, acyl bromides, and acid anhydrides of hydrocarbon carboxylic acids having from 2 to 12 carbon atoms, inclusive. Illustrative acyl chlorides and acyl bromides include acetyl chloride, acetyl bromide, benzoyl chloride, anisoyl chloride, para-ethylbenzoyl chloride, paramethylbenzoyl bromide, β-chloropentylpropionyl chloride, lauroyl chloride, decanoyl chloride, octanoyl bromide, and the like. Illustrative acid anhydrides include acetic anhydride, propionic anhydride, butyric anhydride, phenylacetic anhydride, phenylpropionic anhydride, hexanoic anhydride, and the like. In the preferred embodiment of this invention, the acylation reaction is carried out in dry pyridine at room temperature, between 20 and 30° C. under continuous stirring for a period of 1 to 48 hours. After this period the material is recovered by standard procedures such as pouring the pyridine solution into water, decanting the water, and purifying the remaining material by conventional means such as chromatography, extraction, recrystallization, or a combination of these methods, and the like, to give the corresponding N⁴-acyl-1-(2′,3′-di-O-acyl-5′-O-triphenylmethyl - β - D - arabinofuranosyl) cytosine (IIIa) or the corresponding compound IIIb.

The thus-obtained esters corresponding to Formula IIIa and/or IIIb are selectively hydrolyzed by conventional methods such as by treatment with sodium hydroxide, lithium hydroxide, potassium hydroxide, sodium methoxide, sodium ethoxide, potassium ethoxide and the like, using short exposure time and low temperature to avoid cleavage of the N⁴-amido moiety. The reaction is terminated by adding acid, or preferably an exchange resin such as pyridinium Dowex 50 W X 8. The product is obtained by conventional procedures such as evaporating the filtered reaction mixture and chromatographing the crude product. Recrystallization and chromatography is also used to purify the product, a N-acyl-1-(5′-O-triphenylmethyl-β-D-arabinofuranosyl)cytosine (IV).

The phosphorylation of the N⁴-acyl-1-5′-O-triphenylmethyl-β-D-arabinofuranosyl)cytosine (IV) is carried out by the method of G. M. Tener, J. Am. Chem. Soc. 83, 159 (1959). Solvents used in this procedure are anhydrous, non-hydroxylic solvents in which the phosphorylating agent, a phosphate ester, is also soluble. Such solvents include pyridine, picolines, lutidines, and the like. Neutral solvents such as dimethyl sulfoxide, tetrahydrofuran, N,N-dimethylacetamide or dioxane can be used, providing that for each mole of phosphorylating agent one equivalent of base is added. Representative bases for this reaction include pyridine, picolines, lutidines and trialkylamines.

Phosphate esters, which are readily cleaved by an alkali base, are employed and particularly useful for this reaction are 2-substituted-ethyl dihydrogen phosphates of the formula:

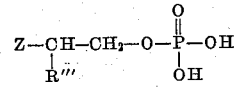

wherein R‴ is selected from the group consisting of hydrogen and lower alkyl; wherein Z is a strongly electronegative substituent selected from the group consisting of

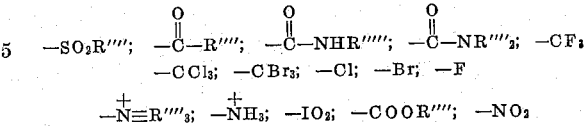

and the like; wherein R⁗ is selected from the group consisting of lower alkyl and aryl; and wherein R⁗′ is selected from the group consisting of hydrogen, lower alkyl and aryl. The preferred 2-substituted-ethyl dihydrogen phosphate is 2-cyanoethyl dihydrogen phosphate.

Instead of a 2-substituted-ethyl dihydrogen phosphate, other dihydrogen phosphate esters which are easily cleaved by a base may be used, for example, o- and p-carboxyphenyl dihydrogen phosphate, o- and p-carbamoylphenyl dihydrogen phosphate, and o- and p-cyanophenyl dihydrogen phosphate.

In the solution containing the 2-disubstituted-ethyl dihydrogen phosphate or o- or p-substituted-phenyl dihydrogen phosphate, the before-mentioned N⁴acyl-1-(5′-O-triphenylmethyl-β-D-arabinofuranosyl)cytosine (IV) is dissolved, if necessary under application of heating between 30 and 50° C. After all the material has passed into solution, a condensing agent such as an alkyl-, cycloalkyl- or aryl-substituted carbodiimide, preferably dicylcohexylcarbodiimide is added. Other compounds unrelated to carbodiimides which can be used as condensing agents are p-toluenesulfonylchloride, methoxyacetylene, ketene-imines, trichloroacetonitrile, substituted cyanamides, α-substituted acetonitrile, alkyl- and arylisocyanates, carboxylic acid chlorides, aralkylchlorocarbonates, and the like.

The preferred temperatures for this reaction are those temperatures around and slightly above room temperature, that is, temperatures between 20 and 40° C.; however, the reaction can be carried out at lower temperatures, such as 5° C., and up to temperatures of about 75° C. without undue side reactions. At a temperature between 20 and 40° C. and at a reasonable concentration, the time required for the reaction to be completed is about 6 to 24 hours. However, reaction times between 1 and 60 hours can be used; the reaction time should be significantly prolonged at greater dilution.

The concentration of the reactants is not critical. Equimolecular amounts of $N^4$-acyl-1-(5'-triphenylmethyl-β-D-arabinofuranosyl)cytosine, the 2-substituted-ethyl dihydrogen phosphate and the condensing agent give approximately quantitative conversion, if sufficient time is allowed for the reaction to be completed. In order to shorten the time of reaction, a 3 to 4 times molar excess of the 2-substituted-ethyl dihydrogen phosphate over $N^4$-acyl - 1 - (5' - triphenylmethyl-β-D-arabinofuranosyl)cytosine is preferred. After the reaction is terminated, a small amount of water is added to inactivate the excess of phosphorylating agent and the excess of condensing agent. The solution is then filtered to remove insoluble material such as the disubstituted ureas resulting from the reaction of carbodiimides with water, and the filtrate is used for the next step, the hydrolytic reaction.

The solution obtained from the prior step is reacted with an alkali hydroxide solution to produce the desired hydrolysis. In the preferred embodiment of the invention, the solution containing the $N^4$-acyl-1-(5'-O-triphenylmethyl-β-D-arabinofuranosyl)-cytosin-2'-yl 2-cyanoethyl phosphate and $N^4$-acyl-1-(5'-O-triphenylmethyl-β-D-arabinofuranosyl)cytosin-3'-yl 2-cyanoethyl phosphate are first concentrated until a small volume is obtained, the concentration preferably achieved under vacuum. When the volume is low enough so that the cooled material becomes a viscous residue, a base, e.g., aqueous lithium, sodium or potassium hydroxide of a 0.4 to 2 normality, is added until the pH of the solution rises to between 12 and 13. Concentrated ammonium hydroxide can also be used. This reaction is carried out at temperatures between 0° C. and the boiling point of the aqueous solution, for a period of between 10 minutes to 24 hours. After termination of the reaction, the mixture is cooled and filtered. From the filtrate the product V is recovered by conventional methods such as extraction, evaporation, precipitation in the form of insoluble phosphate salts, absorption and desorption on resins, recrystallization and the like.

Depending on the reaction conditions, a 1-(5'-O-triphenylmethyl - β - D-arabinofuranosyl)cytosine 2'-phosphate and 1 - (5' - O - triphenylmethyl-β-D-arabinofuranosyl)cytosine-3'-phosphate are obtained with the acyl group on $N^4$ remaining or eliminated. At low temperatures, e.g., 0–20° C., and short reaction periods, e.g., 10–40 minutes, the acyl group on $N^4$ will remain. If the alkaline solution containing the organic cyanophosphate is kept at higher temperatures, e.g., between 75–100° C., the acyl group on $N^4$ is removed.

The thus-obtained 1 - (5' - O-triphenylmethyl-β-D-arabinofuranosyl)cytosine 2'-phosphate and 3'-phosphate in which, depending on temperatures and time in contact with the base reactant, the $N^4$ nitrogen is acylated or not acylated, is thereupon submitted to ether cleavage which is best performed with aqueous acetic acid. Preferably 80% aqueous acetic acid is used during a period of from 4 hours to 4 days at room temperature. The solvent, water and acetic acid is removed in vacuo and the crude products are submitted to anyhdrous ammoniacal methanol or ethanol to give a mixture of 1-β-D-arabinofuranosylcytosine 2'-phosphate and 1-β-D-arabinofuranosylcytosine 3'-phosphate, which are separated from each other by conventional means, e.g., ion exchange chromatography. In the modification B of this process, the ether of configuration II is directly phosphorylated to give the corresponding 1-(5'-O-triphenylmethyl-β-D-arabinofuranosyl)cytosine 2'-phosphate and 3'-phosphate which compounds are submitted to an ether cleavage as shown above utilizing aqueous acetic acid. In this manner compounds VII and VIII are obtained as a mixture which is separated by chromatography. As a third modification phosphorylation of this starting material I provides 1-β-D-arabinofuranosylcytosine 5'-phosphate, 3'-phosphate and 2'-phosphate. These compounds are separated from each other by chromatography.

The following examples are illustrative of the products and processes of the present invention, but are not to be construed as limiting.

In the subsequent examples various ion exchange resins (Dow Company) are utilized which can be described as follows:

DOWEX 50X8

Dowex 50X8 is a strongly acidication exchange resin composed of nuclear sulfonic acid exchange groups attached to a styrene polymer lattice cross-linked with approximately 8% divinylbenzene.

DOWEX AG 50X8

Dowex AG 50X8 is a specially purified and sized form of the Dow Company's resin Dowex 50X8, supplied by Bio-Rad Laboratories of Richmond, Calif.

DOWEX 50WX8

Dowex 50WX8 is a specially purified form of Dowex 50X8 in which the resin has a *white* (W) color rather than the yellow brown color of Dowex 50X8.

DOWEX 1X8

Dowex 1X8 is a strongly basic anion exchange resin composed of quaternary ammonium exchange groups attached to a styrene polymer lattice as described above under Dowex 50X8.

DOWEX AG 1X8

Dowex AG 1X8 is a specially purified and sized form of Dow Company's resin Dowex 1X8, supplied by Bio-Rad Laboratories of Richmond, Calif.

EXAMPLE 1

*1-(5'-O-triphenylmethyl-β-D-arabinofuranosyl)cytosine*

To a solution of 10 g. of 1-β-D-arabinofuranosylcytosine hydrochloride in 200 ml. of pyridine was added 12 g. of triphenylchloromethane. The reaction mixture was thereupon stirred at room temperature (23–26° C.) for 1 week. The reaction mixture was then poured with stirring into 3 l. of ice water, whereupon 1-(5'-O-triphenylmethyl-β-D-arabinofuranosyl)cytosine separated as an oil. The oil crystallized on standing with water overnight, and the crystals were recovered by filtration, then broken up, washed thoroughly with water and air-dried until constant weight was obtained. The thus-obtained solids were triturated with 200 ml. of boiling heptane and, after having been dried, were transferred into 1 l. of boiling acetone containing 1 g. of active charcoal (Darco G–60). The hot suspension was filtered to remove the charcoal and the filtrate was distilled on a steam bath to a volume of about 75 ml. which was allowed to cool to room temperature, thereby giving a crystalline product. The crystalline product was collected on a sintered glass funnel and washed with one 25-ml. portion of ice-cold acetone. The product was thereupon dried giving 13 g. of 1-(5'-O-triphenylmethyl-β-D-arabinofuranosyl)cytosine of melting point 227.5–228° C. with decomposition.

In the same manner, 1-[5'-O-(p-methoxyphenyl)diphenylmethyl-β-D-arabinofuranosyl]cytosine or 1-[5'-O-bis(p-methoxyphenyl)phenylmethyl - β-D - arabinofuranosyl]cytosine can be obtained by reacting 1-β-D-arabinofuranosylcytosine or its hydrochloride in pyridine solution with (p-methoxyphenyl)diphenylchloromethane or bis-(p-methoxyphenyl)phenylchloromethane at a temperature between 0 and 60° C. under continuous stirring.

Similarly to Example 1, instead of triphenylchloromethane, triphenylbromomethane can be used to give the same final product, 1-(5'-O-triphenylmethyl-β-D-arabinofuranosyl)cytosine.

EXAMPLE 2

$N^4$-benzoyl-1-(5'-O-triphenylmethyl-β-D-arabinofuranosyl)cytosine

A mixture of 5.0 g. (10.3 mmoles) of 1-(5'-O-triphenylmethyl-β-D-arabinofuranosyl)cytosine, 35 ml. of dry pyridine, and 5 ml. of benzoyl chloride was stirred at room temperature (24–26° C.) for about 20 hours. The thus obtained reaction mixture was then poured into 400 ml. of cold water and stirred at room temperature for 18 hours. The aqueous portion was then decanted and the residual gummy material was washed twice with water by decantation. The gum and solids were dissolved in 300 ml. of methylene chloride and this solution was washed twice with 50-ml. portions of water and twice with 50 ml. of a saturated aqueous sodium chloride solution. The methylene chloride solution was then dried by passing it through 10 g. of anhydrous sodium sulfate and the filtrate was then evaporated to dryness under reduced pressure. The thus-obtained residue was taken up in 400 ml. of absolute methanol and 200 ml. of dry tetrahydrofuran. The thus-obtained solution was chilled to 0° with ice. The cold solution was then treated with 10 ml. of 25% sodium methoxide in methanol. After 30 minutes at 0°, 110 ml. of Dowex 50WX8 (pyridinium) resin was added whereupon the pH of the solution dropped to about 7. The thus-obtained suspension was filtered to be free of resin, the resin was washed with 250 ml. portions of methanol and the combined washings and filtrate was taken to dryness at 30° under reduced pressure. The resulting residue was dissolved in a small amount of benzene, the benzene solution was absorbed onto a column of silica gel (58 by 4.8 cm.) having a column volume of 1 liter. This column was eluted with twenty 100-ml. portions of 2% methanol in benzene solution followed by forty 100 ml. portions of 5% methanol in benzene solution. Fractions 31–41 as ascertained by thin layer chromatography contained the product. These fractions were combined, acetone was added and the mixture was crystallized as microclusters by adding Skellysolve B hexanes. The material was recrystallized from acetone-Skellysolve B hexanes to give pure $N^4$-benzoyl-1-(5'-O-triphenylmethyl-β-D-arabinofuranosyl)cytosine of melting point 210.5–211.5.

Analysis.—Calcd. for $C_{35}H_{31}O_6N_3$: C, 71.9; H, 5.32; N, 7.19. Found: C, 71.41; H, 5.59; N, 7.46.

EXAMPLE 3

$N^4$-acetyl-(5'-O-triphenylmethyl-β-D-arabinofuranosyl)cytosine (A) $N^4$-acetyl-1 - (2',3'-di-O-acetyl-5'-O-triphenylmethyl-β-D-arabinofuranosyl)cytosine:

A suspension of 750 mg. of 1-(5'-O-triphenylmethyl-β-D-arabinofuranosyl)cytosine (Example 1) in 9 ml. of pyridine was treated with 3 ml. of acetic anhydride with stirring until a uniform solution was obtained. Stirring was then continued for 2 hours whereupon the solution became a crystalline mass. This material was transferred to 90 ml. of water yielding a white crystalline material which was collected by filtration, the solids were washed thoroughly with water, and dried giving 950 mg. of crystals of melting point 249–259.5° C. This material was recrystallized from ethanol giving 800 mg. colorless rosettes of $N^4$-acetyl-1 - (2',3'-di-O-acetyl-5'-O-triphenylmethyl-β-D-arabinofuranosyl)cytosine of melting point 251–252° C.

Analysis.—Calcd. for $C_{32}H_{33}O_7N_3$: C, 66.76; H, 5.44; N, 6.87. Found: C, 67.04; H, 5.47; N, 7.00.

(B) $N^4$ - acetyl-1 - (5'-O-triphenylmethyl - β-D-arabinofuranosyl)cytosine:

In the manner given in Example 2, $N^4$-acetyl-1-(2',3'-di-O-acetyl - 5' - O - triphenylmethyl-β-D-arabinofuranosyl)cytosine was treated at 0° with potassium ethoxide in methyl alcohol at about 0° to give $N^4$-acetyl-1-(5'-O-triphenylmethyl-β-D-arabinofuranosyl)cytosine.

In the manner given in Example 2, other $N^4$-acyl-1-(5'-O-triphenylmethyl-β-D-arabinofuranosyl)cytosines can be prepared by reacting 1-(5'-O-triphenylmethyl-β-D-arabinofuranosyl)cytosine with an acid chloride or an acid anhydride to give compounds of structural Formula IIIa and IIIb which when treated with a base at low temperature provide the corresponding $N^4$-acyl-1-(5'-O-triphenylmethyl-β-D-arabinofuranosyl)cytosine (IV). Representative compounds thus obtained include:

$N^4$-anisoyl-1-(5'-O-triphenylmethyl-β-D-arabinofuranosyl)cytosine,
$N^4$-lauroyl-1-(5'-O-triphenylmethyl-β-D-arabinofuranosyl)cytosine,
$N^4$-propionyl-1-(5'-O-triphenylmethyl-β-D-arabinofuranosyl)cytosine,
$N^4$-butyryl-1-(5'-O-triphenylmethyl-β-D-arabinofuranosyl)cytosine,
$N^4$-valeryl-1-(5'-O-triphenylmethyl-β-D-arabinofuranosyl)cytosine,
$N^4$-hexanoyl-1-(5'-O-triphenylmethyl-β-D-arabinofuranosyl)cytosine,
$N^4$-octanoyl-1-(5'-O-triphenylmethyl-β-D-arabinofuranosyl)cytosine,
$N^4$-decyl-1-(5'-O-triphenylmethyl-β-D-arabinofuranosyl)cytosine,
$N^4$-dodecyl-1-(5'-O-triphenylmethyl-β-D-arabinofuranosyl)cytosine,
$N^4$-(β-cyclopentylpropionyl)-1-(5'-O-triphenylmethyl-β-D-arabinofuranosyl)cytosine,
$N^4$-phenylacetyl-1-(5'-O-triphenylmethyl-β-D-arabinofuranosyl)cytosine,
$N^4$-phenylpropionyl-1-(5'-O-triphenylmethyl-β-D-arabinofuranosyl)cytosine,
$N^4$-acetyl-1-[5'-O-(p-methoxyphenyl)-diphenylmethyl-β-D-arabinofuranosyl]cytosine,
$N^4$-propionyl-1-[5'-O-bis(p-methoxyphenyl)phenylmethyl-β-D-arabinofuranosyl]cytosine,
$N^4$-phenylacetyl-1-(5'-O-triphenylmethyl-β-D-arabinofuranosyl)5-fluorocytosine,
$N^4$-butyryl-1-(5'-O-triphenylmethyl-β-D-arabinofuranosyl)5-chlorocytosine,
$N^4$-hexanoyl-1-[5'-O-(p-methoxyphenyl)diphenylmethyl-β-D-arabinofuranosyl]5-bromocytosine,
$N^4$-octanoyl-1-(5'-O-bis(p-methoxyphenyl)phenylmethyl-β-D-arabinofuranosyl]5-iodocytosine,
$N^4$-lauroyl-1-[5'-O-triphenylmethyl-β-D-arabinofuranosyl]-5-methylcytosine,
$N^4$-decanoyl-1-(5'-O-triphenylmethyl-β-D-arabinofuranosyl)-5-trifluoromethylcytosine,
$N^4$-heptanoyl-1-[5'-O-(p-methoxyphenyl)diphenylmethyl-β-D-arabinofuranosyl]5-methylcytosine,
$N^4$-nonoyl-1-[5'-O-(p-methoxyphenyl)diphenylmethyl-β-D-arabinofuranosyl]5-chlorocytosine,
$N^4$-undecanoyl-1-(5'-O-triphenylmethyl-β-D-arabinofuranosyl)5-fluorocytosine, and the like.

EXAMPLE 4

$N^4$ - benzoyl-1-(5'-O-triphenylmethyl-β-D-arabinofuranosyl)cytosine 2'-phosphate and $N^4$-benzoyl-1-(5'-O-triphenylmethyl-β-D-arabinofuranosyl)cytosine 3'-phosphate A solution of 590 mg. of $N^4$-benzoyl-1-(5'-O-triphenylmethyl-β-D-arabinofuranosyl)cytosine in 10 ml. of pyridine containing 1.5 ml. of M 2-cyanoethyl phosphate (1.5 mmoles) was evaporated in vacuo at 40° C. This process was repeated twice after which the residue was taken up in 5 ml. of purified pyridine and 600 mg. of dicyclohexylcarbodiimide was added and the solution shaken at room temperature in the dark for 2 days. To this reaction mixture was added 5 ml. of water and the solution was then stirred at room temperature for 2 to 3 hours. The insoluble solid was filtered and washed with 1.2 ml. of pyridine and the combined filtrate washed twice with Skellysolve B hexanes. The Skellysolve B hexanes was removed under reduced pressure and the residual pyridine solution chilled to ice temperature. This solution was then treated with 6.5 ml. of 2 N aqueous sodium hydroxide for 20 minutes at low temperature (about 0° C.). The reaction was terminated by the addition of 15 ml. of pyridinium Dowex 50 WX8 resin. The resin-free solution and three 5-ml. washes of 50% aqueous pyridine were combined and then taken to dryness at 40° under reduced pressure. The thus-obtained crude materials, a mixture containing both the 2'- and the 3'-phosphate of $N^4$-benzoyl-1-(5'-O-triphenylmethyl-β-D-arabinofuranosyl)cytosine, was not separated for the next step.

Separation of $N^4$-benzoyl-1-(5'-O-triphenylmethyl-β-D-arabinofuranosyl)cytosine 2'-phosphate from the corresponding 3'-phosphate is accomplished by chromatography as shown in Example 5 for the end products, the 2'- and 3'-phosphates of 1-β-D-arabinofuranosylcytosine. In this manner $N^4$-benzoyl-1-(5'-O-triphenylmethyl-β-D-arabinofuranosyl)cytosine 2'-phosphate and 3'-phosphate were obtained. In the same manner other 2'- and 3'-phosphates of N-acyl-1-(5'-O-T-β-D-arabinofuranosyl)cytosines are obtained in which T is defined as before.

EXAMPLE 5

1-β-D-arabinofuranosylcytosine 2'-phosphate and 1-β-D-arabinofuranosylcytosine 3'-phosphate The total amount of product of Example 4 consisting of $N^4$-benzoyl-1-(5'-O-triphenylmethyl-β-D-arabinofuranosyl)cytosine 2'- and 3'-phosphates were taken up with 30 ml. of 80% aqueous acetic acid and this reaction mixture was allowed to stand at room temperature for 56 hours. The aqueous acetic acid was then removed at 40° in vacuo and the dry residue suspended in 100 ml. of water, and filtered free of trityl alcohol. The filtrate was taken to dryness in vacuo, giving a light yellow gum-like material which upon thin-layer chromatography indicated two major products. $N^4$-benzoyl-1-β-D-arabinofuranosylcytosine 2'-phosphate and 3'-phosphate. This residue was thereupon taken up in 3 ml. of saturated anhydrous ammoniacal methanol and the resulting solution was allowed to stand for 18 hours at room temperature (22–25° C.). The solvent and ammonia were then removed under reduced pressure and the resulting residue taken up in a small volume of water and chromatographed on a column of dimensions 2.8 by 24 cm., charged with Dowex AG 1 X 8 (formate) ion exchange resin, eluted first with 2 l. of 0.01 molar formic acid, followed by 5 l. of 0.02 molar formic acid, and collecting 20 ml. fractions. The fractions containing the 2'-phosphate came off first as determined by the NMR spectrum and expected retention of the product. These fractions were combined, freeze-dried and recrystallized from water to give 1-β-D-arabinofuranosylcytosine 2'-phosphate $\lambda_{max.}^{pH\ 5}$ 274 mμ whose structure was confirmed by nuclear magnetic resonance. In the later fractions the 1-β-D-arabinofuranosylcytosine 3'-phosphate was obtained having $\lambda_{max.}^{pH\ 5}$ 274 mμ

EXAMPLE 6

$N^4$-acetyl-1-(5'-O-triphenylmethyl-β-D-arabinofuranosyl)cytosine 2'-phosphate and 3'-phosphate In the manner given in Example 4, $N^4$-acetyl-1-(5'-O-triphenylmethyl-β-D-arabinofuranosyl)cytosine was reacted with 2-cyanoethyl phosphate in the presence of N,N'-dicyclohexylcarbodiimide and the product was treated with potassium ethoxide to give a mixture of $N^4$-acetyl-1-(5'-O-triphenylmethyl-β-D-arabinofuranosyl)cytosine 2'-phosphate and $N^4$-acetyl-1-(5'-O-triphenylmethyl-β-D-arabinofuranosyl)cytosine 3'-phosphate.

EXAMPLE 7

1-β-D-arabinofuranosylcytosine 2'-phosphate and 1-β-D-arabinofuranosylcytosine 3'-phosphate In the manner given in Example 5, the mixture of the 2'- and 3'-phosphate of $N^4$-acetyl-1-(5'-O-triphenylmethyl-β-D-arabinofuranosyl)cytosine was first submitted to ether cleavage with 80% aqueous acetic acid and thereupon to amminolysis with methanol saturated with ammonia to give 1-β-D-arabinofuranosylcytosine 2'-phosphate and 1-β-D-arabinofuranosylcytosine 3'-phosphate which could be separated from each other by ion exchange chromatography.

In the manner given in Example 4, other $N^4$-acyl-1-(5'-O-triphenylmethyl-β-D-arabinofuranosyl)cytosines could be converted to their 2'- and 3'-phosphates by treatment with 2-cyanoethyl phosphate in the presence of a carbodiimide and subsequent treatment with a base such as lithium hydroxide, sodium hydroxide, potassium hydroxide, for short periods and at low temperature. Representative compounds thus obtained include: the 2'-phosphate and the 3'-phosphate of $N^4$-lauroyl-1-(5'-O-triphenylmethyl-β-D-arabinofuranosyl)cytosine, $N^4$-anisoyl-1-(5'-O-triphenylmethyl-β-D-arabinofuranosyl)cytosine, $N^4$-propionyl-1-(5'-O-triphenylmethyl-β-D-arabinofuranosyl)cytosine, $N^4$-butyryl-1-(5'-O-triphenyl-β-D-arabinofuranosyl)cytosine, $N^4$-valeryl-1-(5'-O-triphenylmethyl-β-D-arabinofuranosyl)cytosine, $N^4$-hexanoyl-1-(5'-O-triphenylmethyl-β-D-arabinofuranosyl)cytosine, $N^4$-octanoyl-1-(5'-O-triphenylmethyl-β-D-arabinofuranosyl)cytosine, $N^4$-decyl-1-(5'-O-triphenylmethyl-β-D-arabinofuranosyl)cytosine, $N^4$-dodecyl-1-(5'-O-triphenylmethyl-β-D-arabinofuranosyl)cytosine, $N^4$-(β-cyclopentylpropionyl)-1-(5'-O-triphenylmethyl-β-D-arabinofuranosyl)cytosine, $N^4$-phenylacetyl-1-(5'-O-triphenylmethyl-β-D-arabinofuranosyl)cytosine, $N^4$-phenylpropionyl-1-(5'-O-triphenylmethyl-β-D-arabinofuranosyl)cytosine, and the like.

By the methods given in Examples 1 and 2, $N^4$-acyl-1-[5'-O-(p-methoxyphenyl)diphenylmethyl-β-D-arabinofuranosyl]cytosines and $N^4$-acyl-1-[5'-O-bis(p-methoxyphenyl)phenylmethyl-β-D-arabinofuranosyl]cytosines and 5-substituted analogues thereof can be prepared, such as: $N^4$-anisoyl-1-[5'-O-(p-methoxyphenyl)diphenylmethyl-β-D-arabinofuranosyl]cytosine; $N^4$-acetyl-1-[5'-O-bis(p-methoxyphenyl)phenylmethyl β-D-arabinofuranosyl]-5-trifluoromethylcytosine, $N^4$-acetyl-1-(5'-O-triphenylmethyl-β-D-arabinofuranosyl)-5-fluorocytosine, $N^4$-benzoyl-1-[5'-O-(p-methoxyphenyl)-diphenylmethyl-β-D-arabinofuranosyl]-5-chlorocytosine, $N^4$-benzoyl-1-[5'-O-bis(p-methoxyphenyl)phenylmethyl-β-D-arabinofuranosyl]-5-bromocytosine, $N^4$-phenylacetyl-1-(5'-O-triphenylmethyl-β-D-arabinofuranosyl)-5-iodocytosine, $N^4$-lauroyl-1-[5'-O-triphenylmethyl-β-D-arabinofuranosyl]-5-fluorocytosine, $N^4$-(β-cyclopentylpropionyl)-1-[5'-O-bis(p-methoxyphenyl)phenylmethyl-β-D-arabinofuranosyl]-5-trifluoromethylcytosine, $N^4$-acetyl-1-[5'-O-(p-methoxyphenyl)diphenylmethyl-β-D-arabinofuranosyl]cytosine, $N^4$-propionyl-1-[5'-O-bis(p-methoxyphenyl)phenylmethyl - β - D-arabinofuranosyl]cytosine, N⁴-phenylacetyl-1-(5' - O - triphenylmethyl-β-D-arabinofuranosyl)-5-fluorocytosine, N⁴ - butyryl-1-(5'-O-triphenylmethyl-β-D-arabinofuranosyl) - 5 - chlorocytosine, N⁴-hexanoyl-1-[5'-O - (p - methoxyphenyl)diphenylmethyl-β-D-arabinofuranosyl] - 5-bromocytosine, N⁴ - octanoyl-1-[5'-O-bis(p-methoxyphenyl)phenylmethyl - β - D-arabinofuranosyl]-5 - iodocytosine, N⁴-lauroyl-1-[5'-O-triphenylmethyl-β-D - arabinofuranosyl] - 5-methylcytosine, N⁴-decanoyl-1-(5' - O - triphenylmethyl-β-D-arabinofuranosyl)-5-trifluoromethylcytosine, N⁴ - heptanoyl - 1-[5'-O-(p-methoxyphenyl)diphenylmethyl - β - D-arabinofuranosyl]-5-methylcytosine, N⁴ - nonoyl - 1-[5'-O-(p-methoxyphenyl)phenylmethyl - β - D-arabinofuranosyl]-5-chlorocytosine, N⁴ - undecanoyl - 1-(5'-O-triphenylmethyl-β-D-arabinofuranosyl)-5-fluorocytosine, and the like.

These compounds can be phosphorylated with 2-cyanoethylphosphate in the presence of a carbodiimide, followed by treatment with a base, as shown in Example 4 to give the corresponding 2'- and 3'-phosphate of the above-listed N⁴ - acyl-1-(5'-O-triphenylmethyl-β-D-arabinofuranosyl)cytosine.

These compounds by treatment with aqueous acetic acid and then methanol or ethanol saturated with ammonia in the cold, as in Example 5, provide the 2'-phosphate and 3'-phosphate of 1-β-D-arabinofuranosylcytosine.

EXAMPLE 8

*1 - (5'-O-triphenylmethyl-β-D-arabinofuranosyl)cytosine 2'-phosphate and 1-(5'-O-triphenylmethyl-β-D-arabinofuranosyl)cytosine 3'-phosphate*

In the manner given in Example 4, 970 mg. of 1-(5'-O - triphenylmethyl-β-D-arabinofuranosyl)cytosine was treated with 2-cyanoethyl phosphate in the presence of N,N - dicyclohexylcarbodiimide and the product was thereupon treated with aqueous sodium hydroxide at a temperature of 0°, to give a mixture of the 2'-phosphate and 3'-phosphate of 1-(5'-O-triphenylmethyl-β-D-arabinofuranosyl)cytosine.

EXAMPLE 9

*1-β-D-arabinofuranosylcytosine 2'-phosphate and 1-β-D-arabinofuranosylcytosine 3'-phosphate*

The mixture of the 2'- and 3'-phosphates of 1-(5'-O-triphenylmethyl - β - D-arabinofuranosyl)cytosine (from Example 8) was dissolved in 100 ml. of 80% aqueous acetic acid. This mixture was allowed to stand at room temperature for a period of 4 days. There after the solvent was removed under reduced pressure at 40° C. to give a dry residue which was taken up in a small amount of water, filtered free of triphenylcarbinol and absorbed onto a column of Dowex AG 1X8 (formate) ion exchange resin of dimensions 2.8 by 24 cm. and eluted with 7 l. of 0.01 molar formic acid, followed by 5 l. of 0.02 molar formic acid, collecting 20 ml. fractions. Fractions 195–210 were combined, and freeze-dried to give 10 mg. of 1-β-D-arabinofuranosylcytosine 2'-phosphate. Fractions 426–470 were combined, freeze-dried and isolated to give 112 mg. of 1-β-D-arabinofuranosylcytosine 3'-phosphate.

EXAMPLE 10

*1-β-D-arabinofuranosylcytosine 2'-phosphate, 1-β-D-arabinofuranosylcytosine 3'-phosphate, and 1-β-D-arabinofuranosylcytosine 5'-phosphate*

A solution was prepared containing 2.8 g. of 1-β-D-arabinofuranosylcytosine hydrochloride, 34 ml. of 0.325 molar pyridinium 2-cyanoethyl phosphate (11 mmoles) to which was added an additional 16 ml. of dry pyridine, and 4.75 g. of dicyclohexylcarbodiimide (22 mmoles). This solution was shaken in the dark for 48 hours. To the resulting colorless suspension was added 10 ml. of water and the reaction mixture was stirred at room temperature (about 24°) for one hour, after which it was diluted with additional water (20 ml.) and the insoluble urea was filtered. The filtrate was taken to dryness in vacuo, redissolved in 50 ml. of water and again taken to dryness to eliminate residual pyridine. The residue was partitioned between 75 ml. of water and 75 ml. of ether. The ether portion was discarded and the aqueous portion was distilled free of ether in vacuo and then treated with 2.16 g. of lithium hydroxide (90 mmoles) at 100° for 1 hour, after which the chilled suspension was filtered free of lithium phosphate. The solution was thereupon adjusted to pH 7 by addition of Dowex 50X8 resin (H⁺ form). The solution was filtered to obtain a resin-free solution which was reduced to 25 ml. volume under reduced pressure. This concentrate was passed through a column of 75 ml. content of Dowex 50X8 resin which was then eluted with water until the pH of the eluate was about 5. The effluent (circa 250 ml.) was adjusted to pH 7.5 with ammonium hydroxide. The solution was reduced in volume to 25 ml. and absorbed on a column of Dowex AG 1X8 (formate) having a column volume of 150 ml. The column was eluted with 1 column volume of water and then 0.02 molar aqueous formic acid solution until a solution was received from the column which was opaque to ultraviolet (Vanguard 1056 O.D. column monitor at 260 millimicrons). The effluent was collected in 20 ml. fractions at a flow rate of 2 ml. per minute. Fractions 90–160, containing the major product, 1-β-D-arabinofuranosylcytosine 5'-phosphate, were combined and freeze-dried giving 40 mg. of this material. Fractions 120–152 were combined and lyophilized giving a colorless gum consisting of the 2'- and 3'-phosphate of 1-β-D-arabinofuranosylcytosine. Separation of the 2'-phosphate from the 3'-phosphate of 1-β-D-arabinofuranosylcytosine was carried out in the manner described in Example 8.

EXAMPLE 11

*1-β-D-arabinofuranosyl-5-fluoromethylcytosine 2'-phosphate and 3'-phosphate*

In the manner given in Example 8, 1-(5'-O-triphenylmethyl - β-D-arabinofuranosyl)-5-trifluoromethylcytosine was treated with 2-cyanoethyl phosphate in the presence of N,N'-dicyclohexylcarbodiimide and thereupon with lithium hydroxide to give a mixture of 2'-phosphate and 3' - phosphate of 1 - (5'-O-triphenylmethyl-β-D-arabinofuranosyl)-5-trifluoromethylcytosine.

Treatment of this mixture as in Example 9 with aqueous acetic acid produced 2'- and 3'-phosphates of 1-β - D - arabinofuranosyl-5-trifluoromethylcytosine which could be separated into the components by chromatography to give 1-β-D-arabinofuranosyl-5-trifluoromethylcytosine 2'-phosphate and -β-D-arabinofuranosyl-5-trifluoromethylcytosine 3'-phosphate.

EXAMPLE 12

*1-β-D-arabinofuranosyl-5-fluorocytosine 2'-phosphate, 1-β-D-arabinofuranosyl-5-fluorocytosine 3'-phosphate, 1-β-D-arabinofuranosyl-5-fluorocytosine 5'-phosphate*

In the manner given in Example 10, 1-β-D-arabinofuranosyl-5-fluorocytosine was phosphorylated with 2-cyanoethyl phosphate in the presence of N,N-dicyclohexylcarbodiimide and thereupon treated with lithium hydroxide to give a mixture of the 3 possible phosphates which were separated by chromatography to give the constituents, 1 - β - D-arabinofuranosyl-5-fluorocytosine 2'-phosphate, 1-β-D-arabinofuranosyl-5-fluorocytosine 3'-phosphate, and 1-β-D-arabinofuranosyl-5-fluorocytosine 5'-phosphate.

I claim:
1. A nucleoside phosphate selected from the group consisting of:

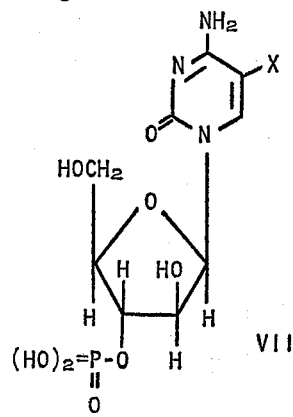 and 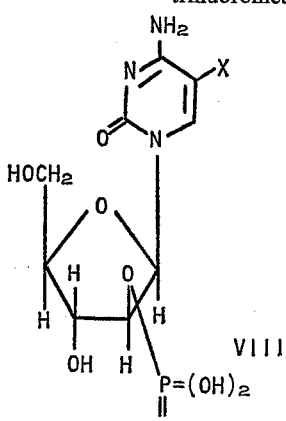

wherein X is selected from the group consisting of methyl, trifluoromethyl, fluorine, chlorine, bromine and iodine.

2. 1-β-D-arabinofuranosylcytosine 3'-phosphate.
3. 1-β-D-arabinofuranosyl-5-trifluoromethylcytosine 2'-phosphate.
4. 1-β-D-arabinofuranosyl-5-trifluoromethylcytosine 3'-phosphate.
5. A compound selected from the group consisting of:

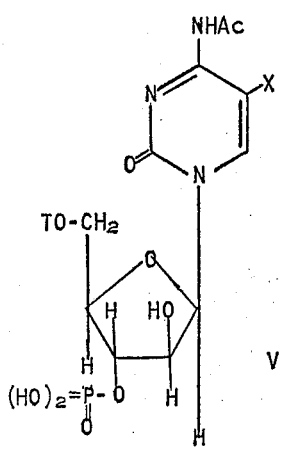 and 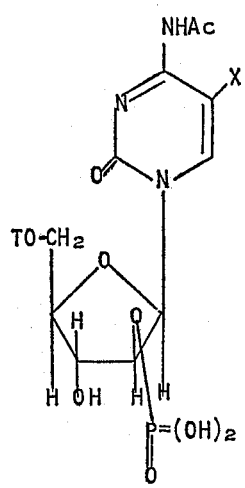

wherein Ac is the acyl group of a hydrocarbon carboxylic acid containing from 2 to 12 carbon atoms, inclusive, wherein T is selected from the group consisting of triphenylmethyl, (p-methoxyphenyl)-diphenylmethyl and bis(p-methoxyphenyl)phenylmethyl, and wherein X is selected from the group consisting of hydrogen, methyl, trifluoromethyl, fluorine, chlorine, bromine and iodine.

6. N⁴ - benzoyl - 1(5' - O - triphenylmethyl - 1 - β - D-arabinofuranosyl) - cytosine 2' - phosphate.
7. N⁴ - benzoyl- 1 - (5' - O - triphenylmethyl - β - D-arabinofuranosyl) - cytosine 3' - phosphate.
8. 1 - (5' - O - triphenylmethyl - β - D - arabinofuranosyl) - cytosine 2' - phosphate.
9. 1 - (5' - O - triphenylmethyl - β - D - arabinofuranosyl)cytosine 3' - phosphate.

10. A process for the production of a nucleoside phosphate selected from the group consisting of:

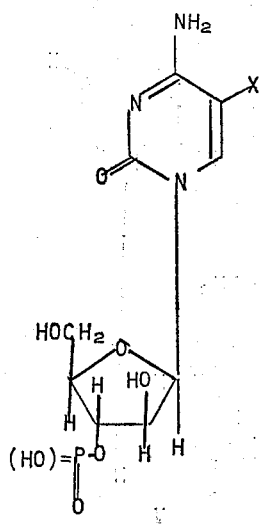 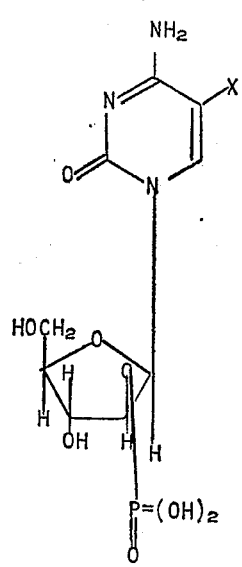

wherein X is selected from the group consisting of a hydrogen, methyl, trifluoromethyl, fluorine, chlorine, bromine and iodine, which comprises: treating a 1-β-D-arabinofuranosylcytosine of Formula I:

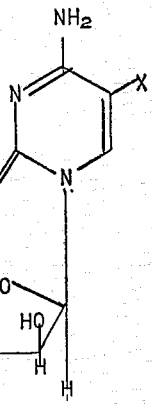

wherein X has the significance of above, with an etherifying agent selected from the group consisting of triphenylchloromethane, triphenylbromomethane, (p-methoxyphenyl)diphenylmethylchloromethane, bis (p-methoxyphenyl)phenylchloromethane to give the corresponding compound II:

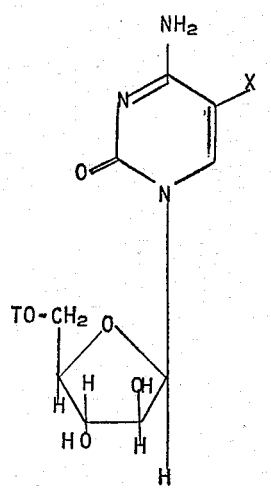

wherein X is defined as hereinabove and T is selected from the group consisting of triphenylmethyl, (p-methoxyphenyl)diphenylmethyl and bis(p-methoxyphenyl)phenylmethyl; acylating compound II and treating the resultant compound with an alkali base at a temperature of −10 to +10° for a period of less than 60 minutes, to obtain a compound of Formula IV:

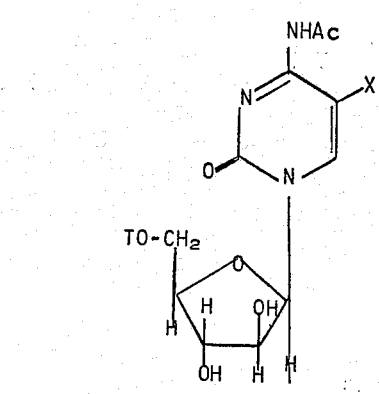

wherein Ac is the acyl group of a hydrocarbon carboxylic acid containing from 2 to 12 carbon atoms, inclusive, and wherein T and X are defined as above; treating IV with a phosphorylating agent in the presence of a condensing agent and then with an alkali base to give a mixture of the corresponding 2′-phosphate and 3′-phosphate of the formula:

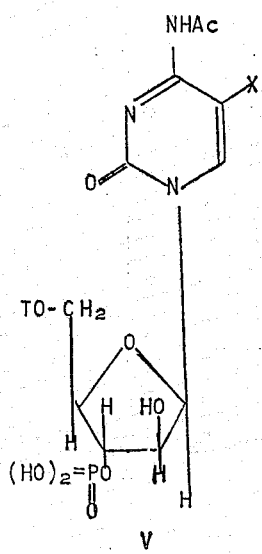

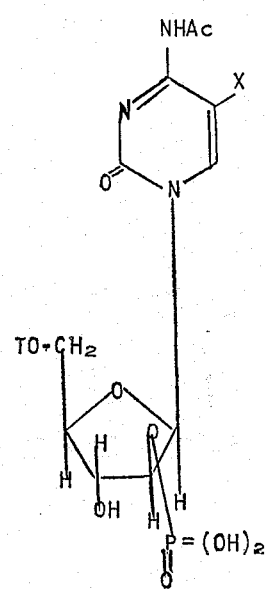

wherein Ac, T and X are defined as hereinabove; treating this mixture with aqueous acetic acid, subsequently with an ammoniacal alkanol, and chromatographically separating the resulting mixture to give the compounds of Formulae VII and VIII.

11. The process of claim 10 wherein the starting material is 1 - β - D - arabinofuranosylcytosine and the end products are 1 - β - D - arabinofuranosylcytosine 2'-phosphate and 1 - β - D - arabinofuranosylcytosine 3'-phosphate.

12. A process for the production of a nucleoside phosphate selected from the group consisting of:

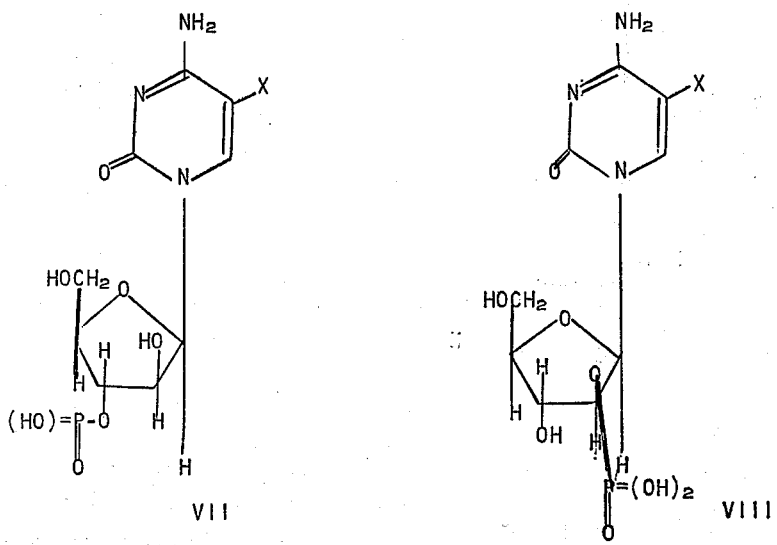

VII   VIII wherein X is selected from the group consisting of hydrogen, methyl, trifluoromethyl, fluorine, chlorine, bromine and iodine, which comprises: treating 1 - β - D - arabinofuranosylcytosine of Formula I:

oxyphenyl)phenylchloromethane to give the corresponding compound II:

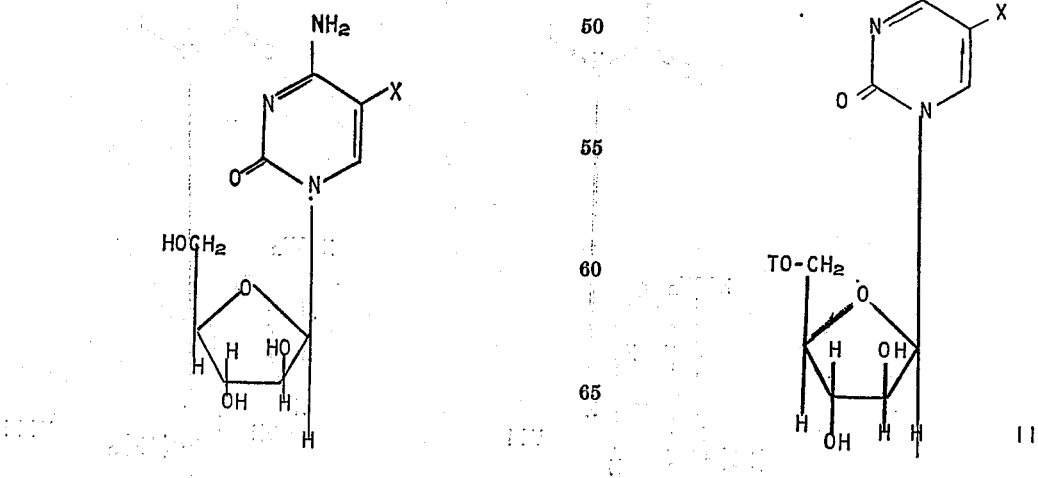

I   II wherein X has the significance of above, with an etherifying agent selected from the group consisting of triphenylchloromethane, triphenylbromomethane, (p-methoxyphenyl)diphenylmethylchloromethane, bis(p - methoxyphenyl)diphenylmethyl and bis(p - methoxyphenyl)phenylmethyl; treating compound II with a phosphorylization agent in the presence of a condensing agent and then with an alkali base to give a mixture of the corresponding 2'-phosphate and 3'-phosphate of the Formulae IX and X:

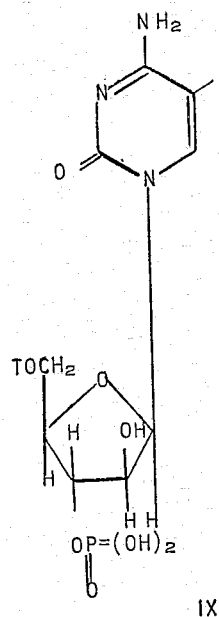

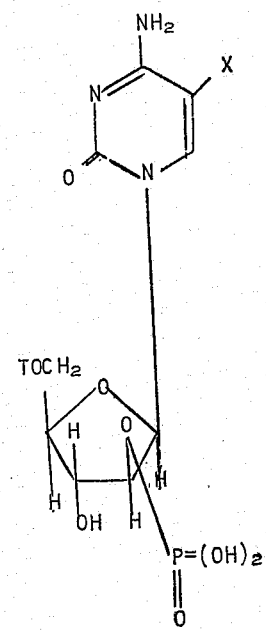

wherein T is defined as above; treating the mixture of compounds IX and X with aqueous acetic acid, and chromatographically separating the resulting mixture to obtain compounds VII and VIII.

13. The process of claim 12 wherein the starting material is 1 - β - D - arabinofuranosylcytosine and the end products are 1 - β - D - arabinofuranosylcytosine 2'-phosphate and 1 - β - D - arabinofuranosylcytosine 3' - phosphate.

14. A process for the production of a nucleoside phosphate selected from the group consisting of:

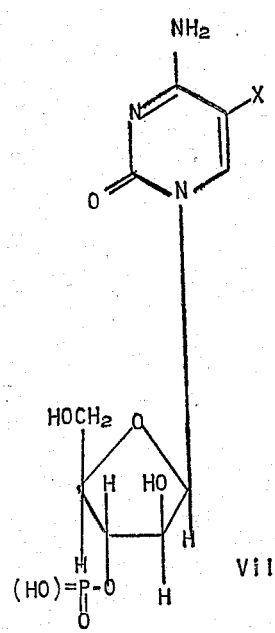

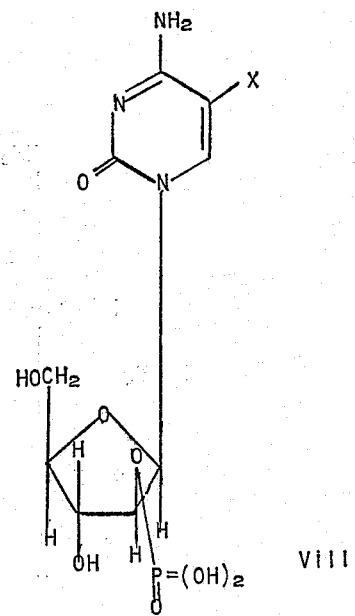

wherein X is selected from the group consisting of hydrogen, methyl, trifluoromethyl, fluorine, chlorine, bromine and iodine, which comprises: treating a 1 - β - D-arabinofuranosylcytosine of Formula I:

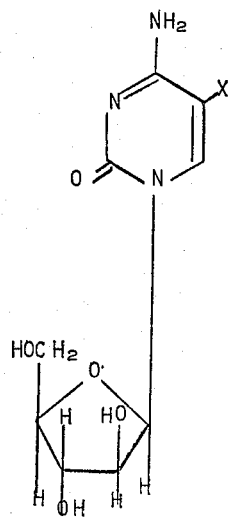

wherein X is defined as above, with a phosphorylation agent in the presence of a condensing agent and with an alkali base to give a mixture of the corresponding 2'-phosphate and 3'-phosphate and 5'-phosphate of the compound of Formula I and separating these phosphates chromatographically from each other to obtain the desired compounds VII and VIII above.

15. The process of claim 14 wherein the starting material is 1 - β - D - arabinofuranosylcytosine and the end products are 1 - β - D - arabinofuranosylcytosine 2'-phosphate, and 1 - β - D - arabinofuranosylcytosine 3'-phosphate.

References Cited

Cardeilhac et al., "Cancer Research," volume 24, 1964, pages 1595–1603.

Tood, "Chemistry and Industry," February 1958, pages 170–176.

LEWIS GOTTS, *Primary Examiner*.

J. R. BROWN, *Assistant Examiner*.